US012770779B2

(12) United States Patent
Koshiba

(10) Patent No.: US 12,770,779 B2
(45) Date of Patent: Oct. 20, 2026

(54) IGNITION COIL

(71) Applicant: DIAMOND&ZEBRA ELECTRIC MFG. CO., LTD., Osaka (JP)

(72) Inventor: Hayato Koshiba, Osaka (JP)

(73) Assignee: DIAMOND&ZEBRA ELECTRIC MFG. CO., LTD., Osaka (JP)

( * ) Notice: Subject to any disclaimer, the term of this patent is extended or adjusted under 35 U.S.C. 154(b) by 161 days.

(21) Appl. No.: 18/862,088

(22) PCT Filed: May 12, 2022

(86) PCT No.: PCT/JP2022/020097
§ 371 (c)(1),
(2) Date: Oct. 31, 2024

(87) PCT Pub. No.: WO2023/218611
PCT Pub. Date: Nov. 16, 2023

(65) Prior Publication Data
US 2025/0285806 A1 Sep. 11, 2025

(51) Int. Cl.
*H01F 38/12* (2006.01)
*F02P 3/02* (2006.01)

(52) U.S. Cl.
CPC ................ *H01F 38/12* (2013.01); *F02P 3/02* (2013.01)

(58) Field of Classification Search
CPC .. H01F 38/12; F02P 3/02; F02P 13/00; H01T 13/04
See application file for complete search history.

(56) References Cited

U.S. PATENT DOCUMENTS 5,720,264 A * 2/1998 Oosuka ..................... F02P 3/02
123/169 PA

FOREIGN PATENT DOCUMENTS

| | | | | | |
|---|---|---|---|---|---|
| JP | 2009121383 | A | * | 6/2009 | |
| JP | 2010-287485 | A | | 12/2010 | |
| KR | 20090081589 | A | * | 7/2009 | ............ H01F 38/12 |

* cited by examiner

*Primary Examiner* — Mohamad A Musleh
(74) *Attorney, Agent, or Firm* — Birch, Stewart, Kolasch & Birch, LLP

(57) ABSTRACT

An ignition coil 2 includes a protector 16 including: a head portion 28 exposed outside an internal combustion engine 4; and a tubular portion 30 extending downward from a bottom surface of the head portion 28 and inserted in a plug hole 6 of the internal combustion engine 4. The ignition coil 2 includes an air passage 64 connecting an external environment and the plug hole 6 of the internal combustion engine 4. The air passage 64 includes a first opening 50 located in a region on an outer surface of a coil assembly 8 located beneath a flange portion 14 or an outer surface of the head portion 28. The region extends in an up-down direction. When viewed in a reference direction that is perpendicular to a central axis Lf of a mounting hole 20 of the flange portion 14 and extends from the central axis Lf of the mounting hole 20 toward a central axis Lp of the protector 16, a centerline of the region overlaps with the central axis Lf of the mounting hole 20. When viewed in the reference direction, a width of the region is equal to a width of the mounting hole 20.

10 Claims, 11 Drawing Sheets

IGNITION COIL

TECHNICAL FIELD

The present specification discloses an ignition coil for an internal combustion engine.

BACKGROUND ART

An ignition coil for an internal combustion engine includes: a coil assembly including a coil that generates a high voltage; a protector extending downward from the coil assembly; and a flange portion having a mounting hole. When the ignition coil is mounted on the internal combustion engine, a lower portion of the protector is inserted in a plug hole of the internal combustion engine. A bolt is inserted in the mounting hole of the flange portion, and the ignition coil is fixed to the internal combustion engine via the bolt.

When the internal combustion engine is in use, the interior of the plug hole becomes hot. The air inside the plug hole expands to increase the pressure inside the plug hole. Japanese Laid-Open Patent Application Publication No. 2010-287485 discloses an ignition device including a communication path for discharging air from a plug hole to the external environment.

CITATION LIST

Patent Literature

PTL 1: Japanese Laid-Open Patent Application Publication No. 2010-287485

SUMMARY OF INVENTION

Technical Problem

An internal combustion engine such as an engine mounted in a vehicle is sometimes exposed to rainwater or cleaning water. Entry of this kind of water into a plug hole of the internal combustion engine through an air passage connecting the external environment and the plug hole could disturb proper combustion. There is a demand for an ignition coil that can reduce water entry into a plug hole.

The present inventors aim to provide an ignition coil including an air passage that is resistant to water entry.

Solution to Problem

An ignition coil for an internal combustion engine according to one embodiment includes: a coil assembly including a primary coil and a secondary coil; an output portion extending downward from the coil assembly; a protector covering an outer circumference of the output portion and extending downward from the coil assembly; and a flange portion projecting backward from the coil assembly and including a mounting hole extending from top to bottom of the flange portion. The protector includes: a head portion that is exposed outside the internal combustion engine when the ignition coil is mounted on the internal combustion engine; and a tubular portion that extends downward from a bottom surface of the head portion and that is inserted in a plug hole of the internal combustion engine when the ignition coil is mounted on the internal combustion engine. The ignition coil includes an air passage having a first opening and a second opening and connecting an external environment and the plug hole of the internal combustion engine. The first opening is located in a region on an outer surface of the coil assembly located beneath the flange portion or an outer surface of the head portion. The region extends in an up-down direction. When viewed in a reference direction that is perpendicular to a central axis of the mounting hole and extends from the central axis of the mounting hole toward a central axis of the protector, a centerline of the region overlaps with the central axis of the mounting hole. When viewed in the reference direction, a width of the region is equal to a width of the mounting hole.

Advantageous Effects of Invention

The ignition coil of this embodiment includes the air passage connecting the external environment and the plug hole of the internal combustion engine. The first opening of the air passage is located in the region located on an outer surface of the coil assembly beneath the flange portion or an outer surface of the head portion. The region extends in the up-down direction. When viewed in a reference direction that is perpendicular to a central axis of the mounting hole and extends from the central axis of the mounting hole toward a central axis of the protector, a centerline of the region overlaps with the central axis of the mounting hole. When viewed in the reference direction, a width of the region is equal to a width of the mounting hole. When the ignition coil is mounted on the internal combustion engine, a bolt is inserted in the mounting hole. The bolt or a receiving portion that receives the bolt is located in a direction in which the region faces. External water is blocked by the bolt or the receiving portion and cannot readily reach the first opening. The ignition coil is resistant to water entry into the air passage.

DESCRIPTION OF EMBODIMENTS

The following will describe in detail preferred embodiments with appropriate reference to the drawings.

Figure 1A:
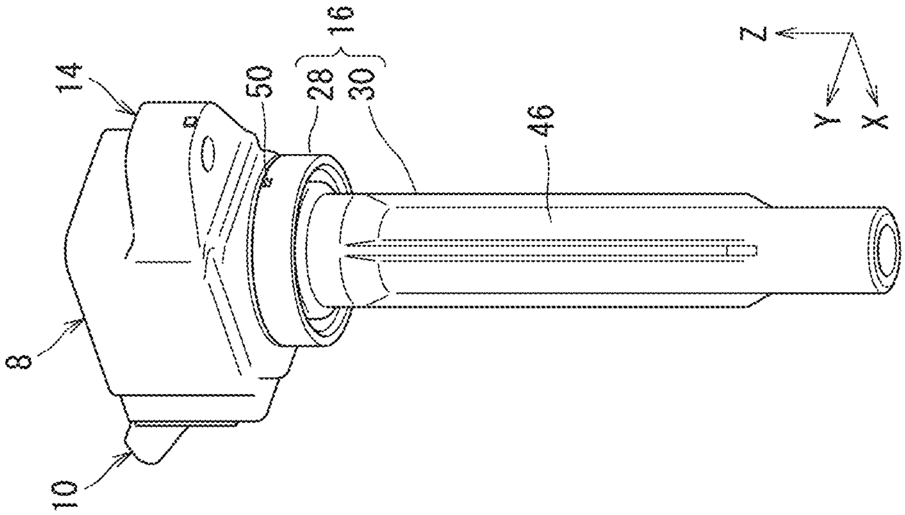
FIG. 1A is a perspective view showing an ignition coil according to one embodiment.

FIG. 1A is a perspective view showing an ignition coil 2 according to one embodiment. In FIG. 1, the arrow X represents the forward direction with respect to the ignition coil 2. The opposite direction is the backward direction. The arrow Y represents the rightward direction with respect to the ignition coil 2. The opposite direction is the leftward direction. The arrow Z represents the upward direction with respect to the ignition coil 2. The opposite direction is the downward direction. The direction-indicating terms such as "forward" and "upward" are used herein to express the relative positional relationship among the below-described components of the ignition coil 2. For example, the direction shown as the "backward" direction in FIG. 1 may be regarded as a "forward" or "rightward" direction as long as the relative positional relationship can be expressed.

Figure 1B:
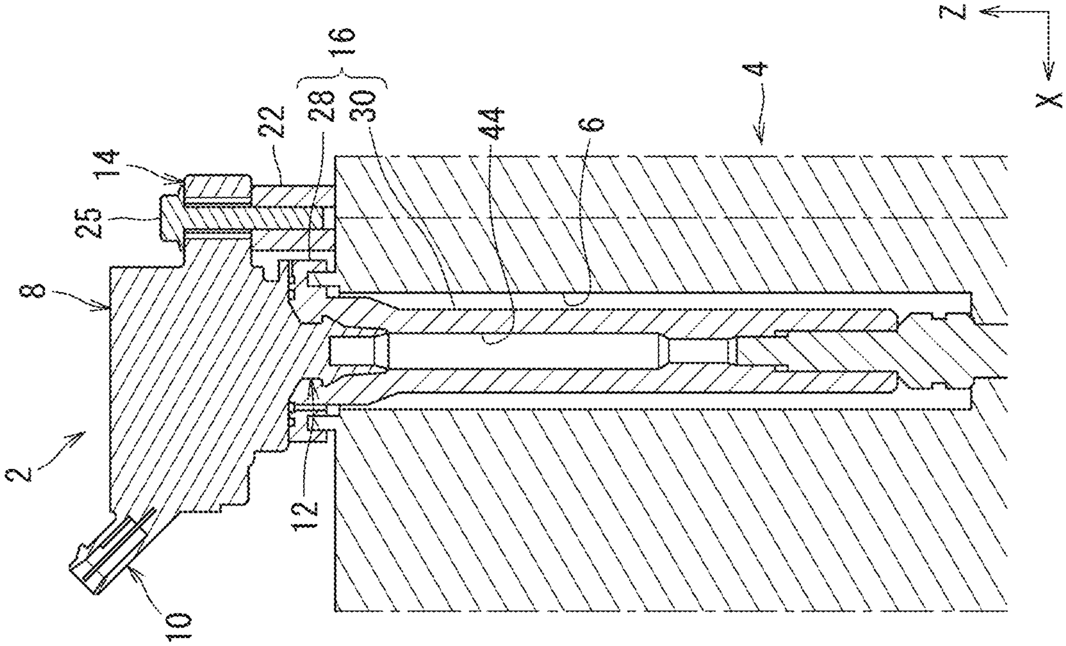
FIG. 1B is a cross-sectional view of the ignition coil of FIG. 1A.
Figure 2:
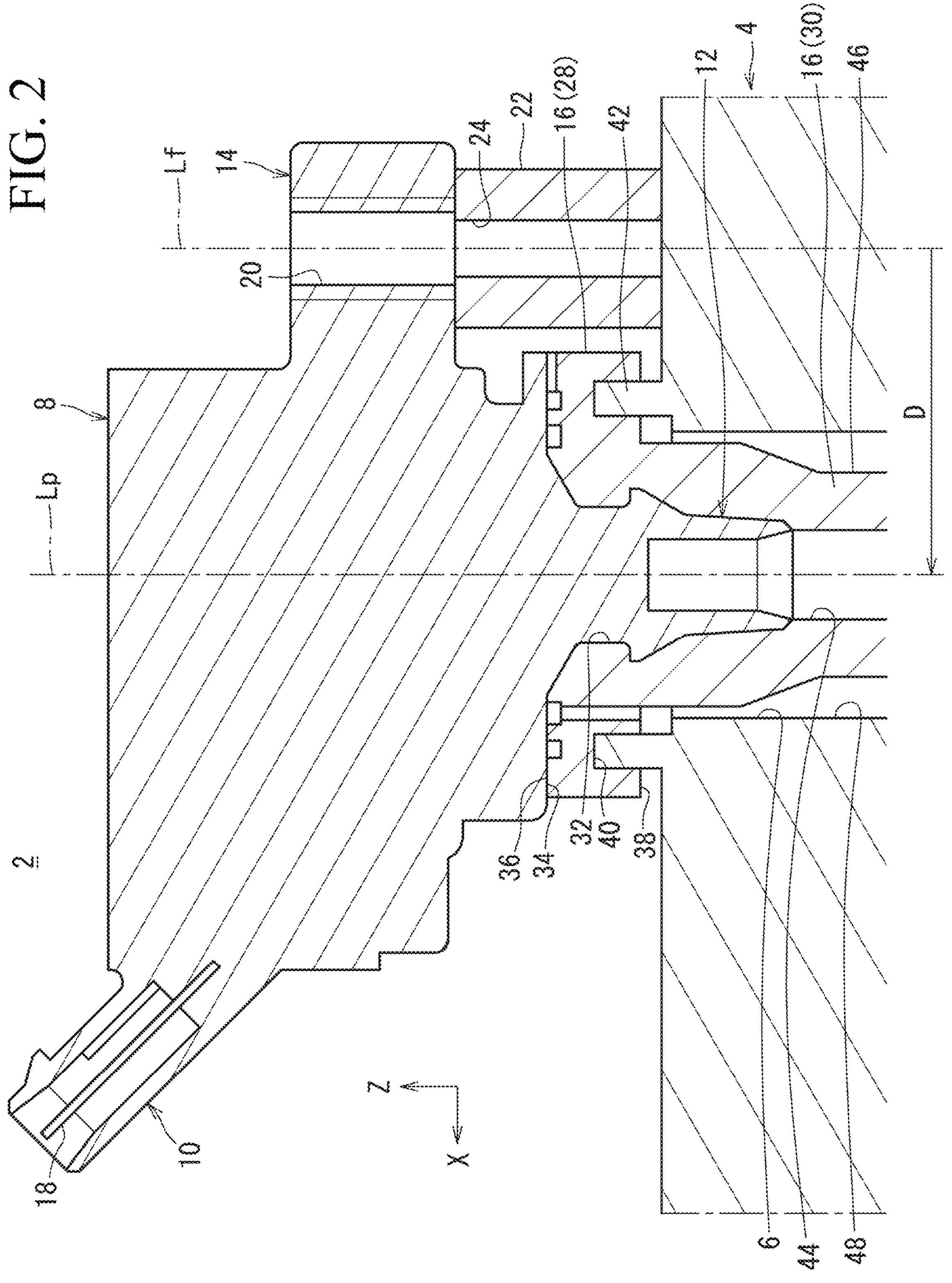
FIG. 2 is an enlarged cross-sectional view of a part of FIG. 1B.

FIG. 1B is a cross-sectional view of the ignition coil 2 of FIG. 1A taken along a plane perpendicular to the left-right direction. FIG. 1B further shows an internal combustion engine 4 with the ignition coil 2 mounted thereon. The internal combustion engine 4 includes a plug hole 6, and a part of the ignition coil 2 is inserted in the plug hole 6. FIG. 2 is an enlarged view of a part of FIG. 1B. The ignition coil 2 includes a coil assembly 8, a connector portion 10, an output portion 12, a flange portion 14, and a protector 16. In FIG. 1B and FIG. 2, the internal structures of the coil assembly 8, the connector portion 10, and the output portion 12 are omitted.

The coil assembly 8 includes: a primary coil, a secondary coil, and an iron core which are not shown in the drawings; and a case enclosing the coils and the iron core. The primary coil is formed by winding a wire around the iron core and the secondary coil is formed by winding a wire around the outside of the primary coil. The number of wire turns in the secondary coil is much greater than the number of wire turns in the primary coil. Thus, a change in the current flowing through the primary coil can generate a high voltage in the secondary coil.

The connector portion 10 is located ahead of the coil assembly 8. The connector portion 10 includes an external terminal 18 to which an external signal is input and an unshown ignitor. The ignitor is a switch that permits or prevents a current flow through the primary coil in response to the signal input to the external terminal 18. The operation of the ignition coil 2 is controlled by the signal input to the external terminal 18.

As shown in FIG. 2, the output portion 12 is located below the coil assembly 8. The output portion 12 is shaped as a tube extending downward from the coil assembly 8. The high voltage generated in the secondary coil is supplied through the output portion 12 to an ignition plug mounted on the internal combustion engine 4.

The flange portion 14 projects backward from the coil assembly 8. The flange portion 14 extends in a direction perpendicular to a direction in which the output portion 12 extends. The flange portion 14 is integral with the case of the coil assembly 8. The flange portion 14 includes a mounting hole 20 extending from top to bottom of the flange portion 14. As shown in FIG. 1B and FIG. 2, a receiving portion 22 of the internal combustion engine 4 is located beneath the mounting hole 20. The receiving portion 22 includes a mounting hole 24. When the ignition coil 2 is mounted on the internal combustion engine 4, a bolt 25 is inserted in the mounting hole 20 of the flange portion 14 and the mounting hole 24 of the receiving portion 22. FIG. 1B shows the bolt 25. The ignition coil 2 is fixed to the internal combustion engine 4 by the bolt 25. The bolt 25 is omitted in FIG. 2.

In this embodiment, the connector portion 10 is located ahead of the coil assembly 8 and the flange portion 14 is located behind the coil assembly 8. The flange portion 14 is across the coil assembly 8 from the connector portion 10. The connector portion 10 and the flange portion 14 may be located, respectively, along side surfaces of the coil assembly 8 that are perpendicular to each other. For example, the connector portion 10 may be located on the right of the coil assembly 8 while the flange portion 14 is located behind the coil assembly 8. The connector portion 10 may be located in another direction relative to the flange portion 14. The direction in which the flange portion 14 is located relative to the coil assembly 8 is defined herein as the "backward" direction with respect to the ignition coil 2, regardless of factors such as the positional relationship between the connector portion 10 and the flange portion 14 and the shape of the coil assembly 8. The direction in which the output portion extends relative to the coil assembly 8 is defined herein as the "downward" direction with respect to the ignition coil 2.

The protector 16 is located below the coil assembly 8. The protector 16 includes a hole extending through the interior of the protector 16. The protector 16 is fitted around the output portion 12. The protector 16 covers the outer circumference of the output portion 12. The protector 16 is made of a rubber composition. A preferred example of the material of the protector 16 is silicone rubber. The protector 16 includes a head portion 28 and a tubular portion 30.

The head portion 28 is ring-shaped. The head portion 28 includes a hole 32 extending through the central region of the head portion 28. The output portion 12 is inserted in the hole 32 of the head portion 28. The output portion 12 extends through the hole 32 of the head portion 28 and extends further downward from the head portion 28. The inner circumferential surface of the hole 32 of the head portion 28 is in contact with the outer circumferential surface of the output portion 12, without any gap between the inner and outer circumferential surfaces. The top surface 34 of the head portion 28 is in contact with the bottom surface 36 of the coil assembly 8.

As shown in FIG. 1B and FIG. 2, when the ignition coil 2 is mounted on the internal combustion engine 4, the head portion 28 is exposed outside the internal combustion engine 4. The head portion 28 covers the opening of the plug hole 6 of the internal combustion engine 4. The outer diameter of the head portion 28 is greater than the inner diameter of the plug hole 6. The inner diameter of the head portion 28 is smaller than the inner diameter of the plug hole 6. As shown in FIG. 2, the bottom surface 38 of the head portion 28 includes a fitting groove 40. The fitting groove 40 is ring-shaped (see FIG. 4B). The top surface of the internal combustion engine 4 includes a ring-shaped protrusion 42. As shown in FIG. 2, the protrusion 42 of the internal combustion engine 4 is fitted in the fitting groove 40 of the head portion 28. The head portion 28 serves as a lid closing the opening of the plug hole 6.

The tubular portion 30 extends downward from the head portion 28. In this embodiment, the tubular portion 30 is integral with the head portion 28. The tubular portion 30 and the head portion 28 may be formed separately from each other. The tubular portion 30 includes a hole 44 continuous with the hole 32 of the head portion 28. The outer diameter of the tubular portion 30 is smaller than the outer diameter of the head portion 28. The outer diameter of the tubular portion 30 is smaller than the inner diameter of the plug hole 6. As shown in FIG. 1B and FIG. 2, when the ignition coil 2 is mounted on the internal combustion engine 4, the tubular portion 30 is inserted in the plug hole 6. There is a gap between the outer circumferential surface 46 of the tubular portion 30 and the inner circumferential surface 48 of the internal combustion engine 4 that defines the plug hole 6.

In FIG. 2, the dashed-dotted line Lf represents the central axis of the mounting hole 20. The dashed-dotted line Lp represents the central axis of the protector 16. The central axis Lp of the protector 16 extends in the up-down direction and passes through the center of the hole 32 of the head portion 28 at the level of the bottom surface 38 of the head portion 28. In FIG. 2, the arrow D represents a direction perpendicular to the central axis Lf and extending from the central axis Lf toward the central axis Lp. This direction is referred to herein as a reference direction D. In this embodiment, the reference direction D is the same as the direction X extending from back to front of the ignition coil 2.

Figure 3:
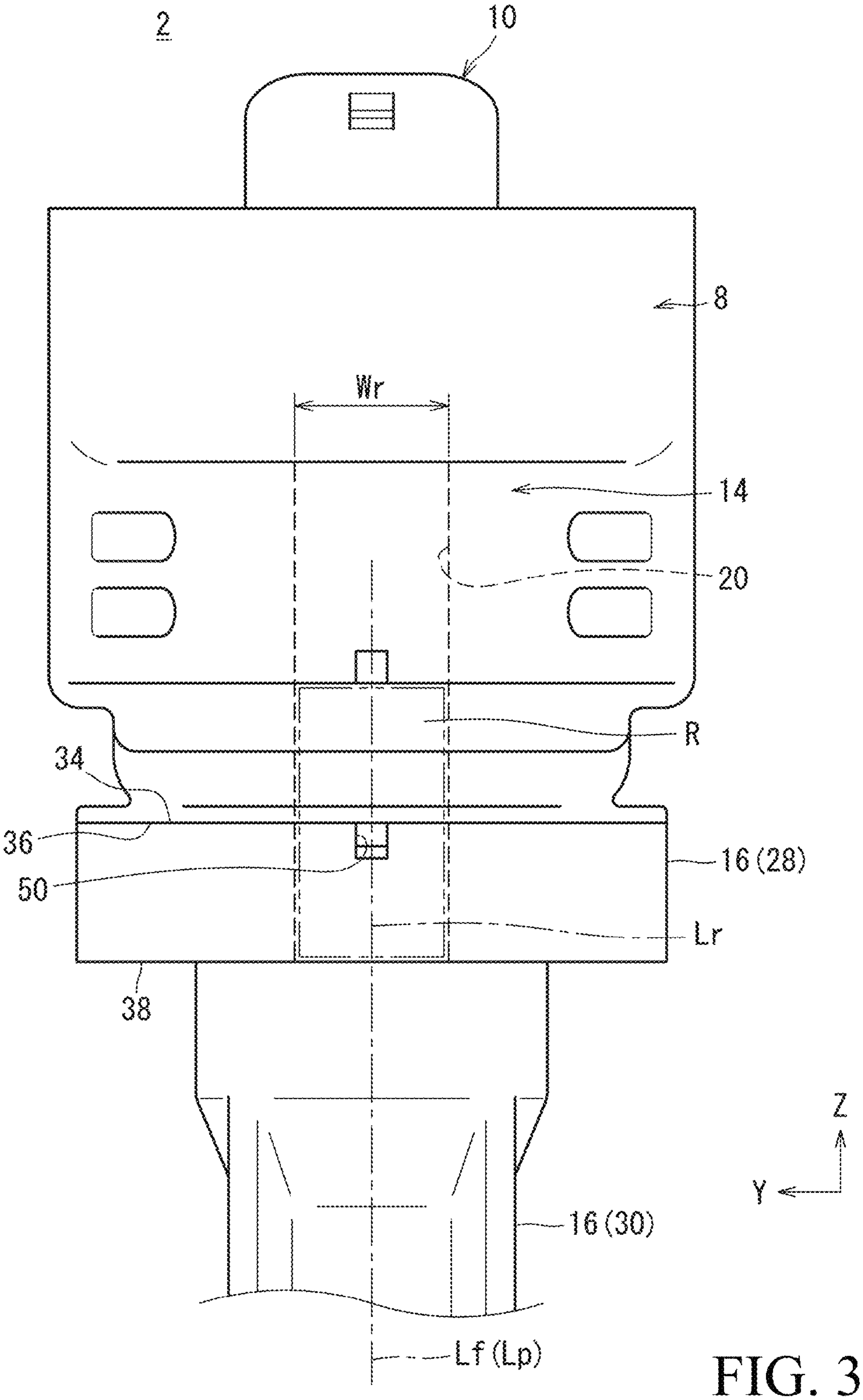
FIG. 3 is an enlarged back view of a part of the ignition coil of FIG. 1.

FIG. 3 shows a part of the ignition coil 2 as viewed in the reference direction D. In this embodiment, FIG. 3 is a back view of the ignition coil 2. In this figure, the central axis Lf and the central axis Lp coincide with each other. In FIG. 3, the reference sign R represents a region located beneath the flange portion 14 and lying on the outer surfaces of the coil assembly 8 and the head portion 28. The region R extends from the lower end of the flange portion 14 to the lower end of the head portion 28 in the up-down direction. The region R, as viewed in the reference direction D, has a centerline Lr overlapping with the central axis Lf of the mounting hole 20 and has a width equal to the width of the mounting hole 20. This region R is referred to herein as a "location region R".

The ignition coil 2 includes an opening 50 in the location region R. The expression "includes an opening in the location region R" means that a part or all of the opening 50 is located within the location region R. As described later, the opening 50 is a first opening 50 of an air passage of the ignition coil 2. In the embodiment of FIG. 3, the first opening 50 is located at an end of the head portion 28 that is adjacent to the coil assembly 8. In the embodiment of FIG. 3, the first opening 50 is located on the centerline Lr.

Figure 4A:
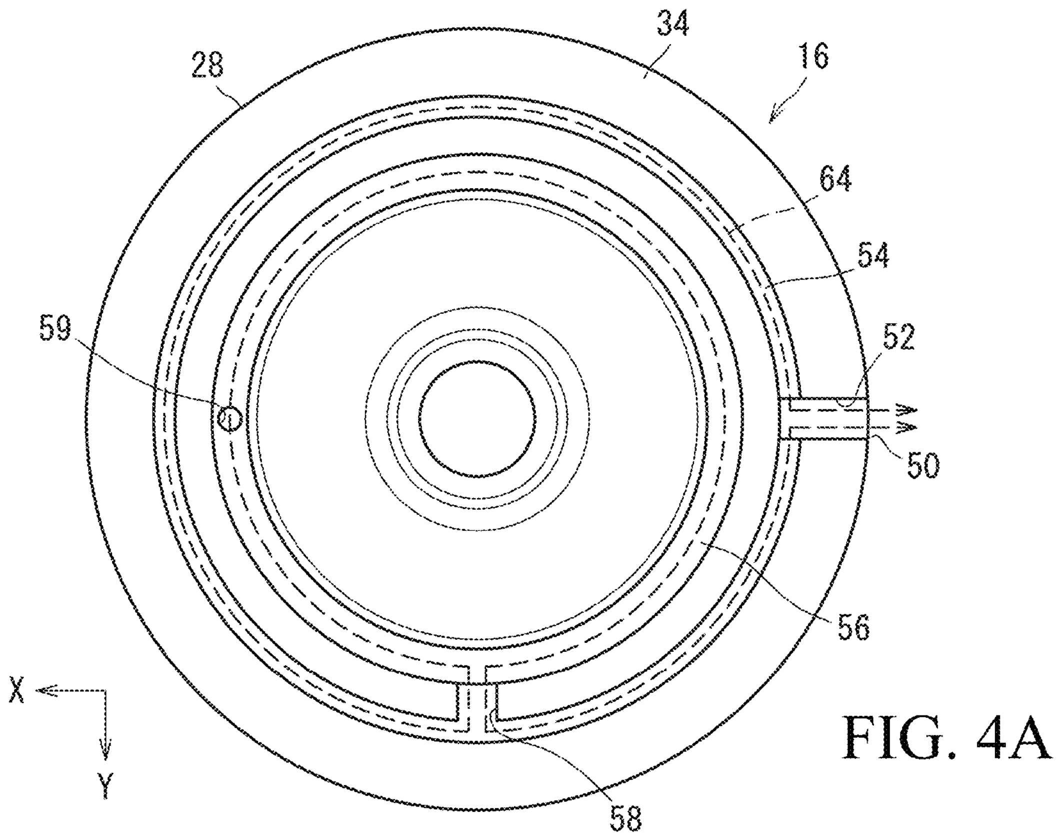
FIG. 4A is a plan view of a protector of the ignition coil of FIG. 1.
Figure 4B:
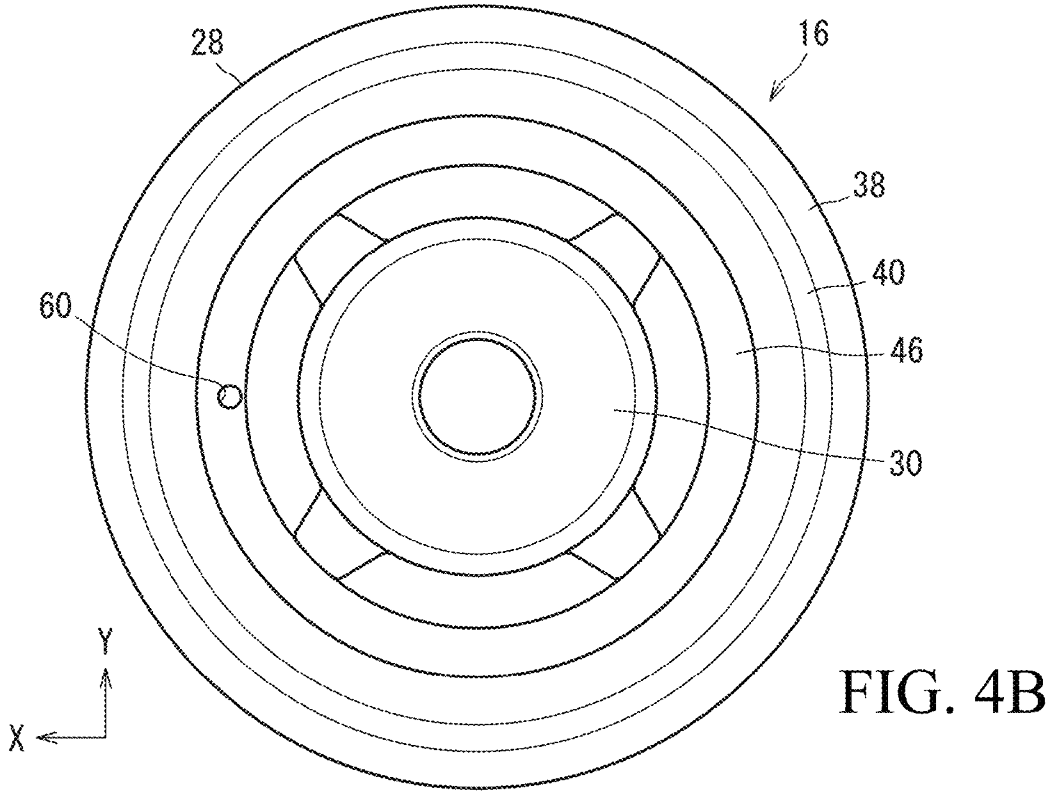
FIG. 4B is a bottom view of the protector.
Figure 5:
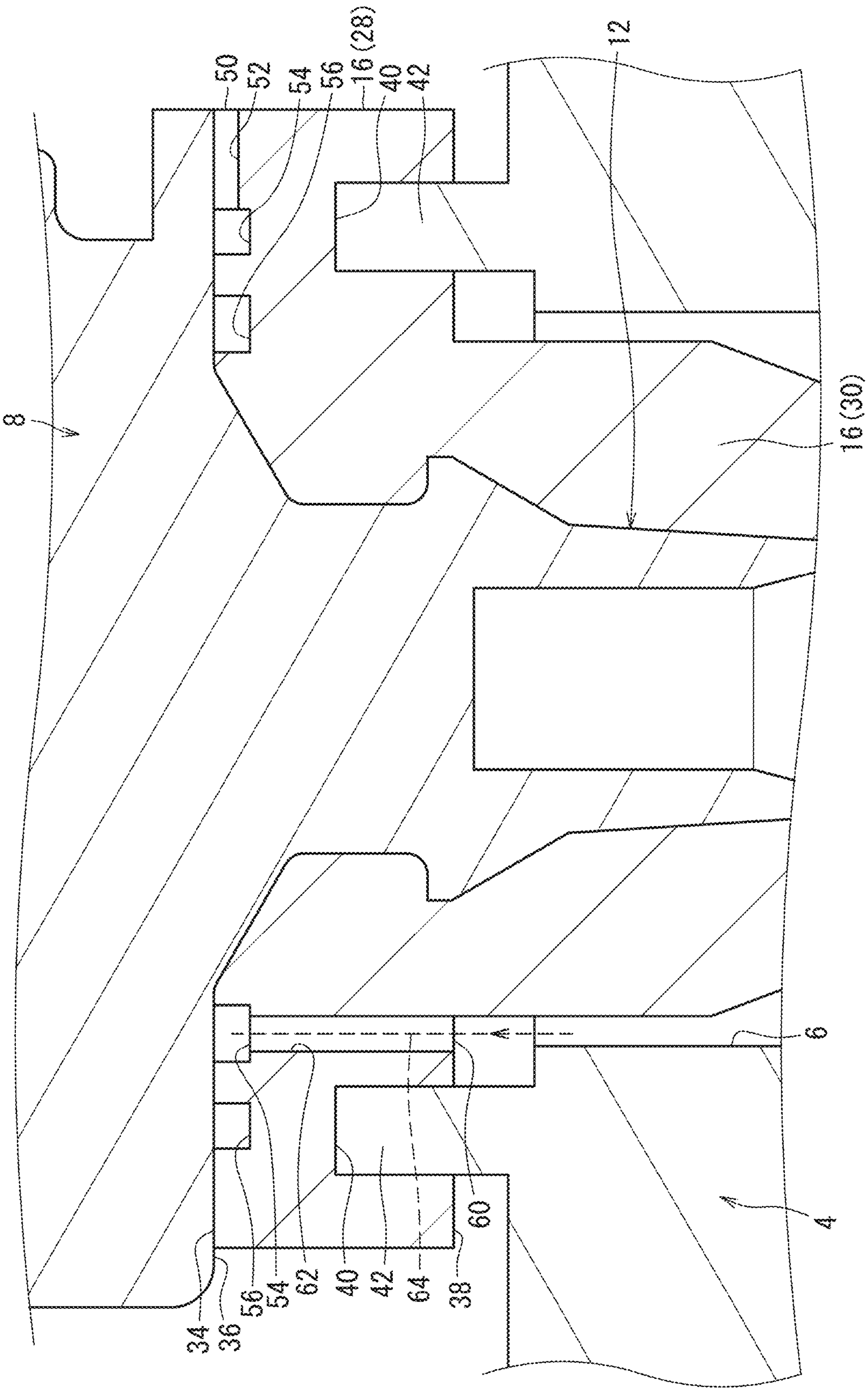
FIG. 5 is an enlarged cross-sectional view of a part of FIG. 2.

FIG. 4A is a plan view of the protector 16. This figure shows the top surface 34 of the head portion 28. FIG. 4B is a bottom view of the protector 16. This figure shows the bottom surface 38 of the head portion 28 and the tubular portion 30. FIG. 5 is an enlarged cross-sectional view of the head portion 28 and its vicinity.

As shown in FIG. 4A and FIG. 5, the top surface 34 of the head portion 28 includes a lead-out groove 52 extending from the first opening 50, a first ring groove 54, and a second ring groove 56. As shown in FIG. 4A, the top surface 34 of the head portion 28 further includes a connection groove 58. The lead-out groove 52 connects the first opening 50 and the first ring groove 54. The connection groove 58 connects the first ring groove 54 and the second ring groove 56. As shown in FIG. 4A, the bottom of the second ring groove 56 includes a hole opening 59. As shown in FIG. 4B, the bottom surface 38 of the head portion 28 includes a hole opening 60. As shown in FIG. 5, there is an air hole 62 extending from the bottom of the second ring groove 56 to the bottom surface 38 of the head portion 28. The opening 60 in the bottom surface 38 of the head portion 28 is a second opening 60 of the air passage. In other words, the ignition coil 2 includes an air passage 64 extending from the first opening 50 to the second opening 60 through the lead-out groove 52, the first ring groove 54, the connection groove 58, the second ring groove 56, and the air hole 62. In FIG. 4A and FIG. 5, the air passage 64 is shown by a dashed line.

As shown FIG. 4B, the fitting groove 40 in the bottom surface 38 of the head portion 28 is ring-shaped. The second opening 60 is located inside the fitting groove 40 and outside the tubular portion 30. As shown in FIG. 5, the second opening 60 is located between the tubular portion 30 and the inner circumferential surface of the internal combustion engine 4 which defines the plug hole 6. The second opening 60 is connected to the plug hole 6. That is, the air passage 64 of the ignition coil 2 connects the external environment and the plug hole 6.

The following descries the effects and benefits of the present embodiment.

The ignition coil 2 of this embodiment includes the air passage 64 connecting the external environment and the plug hole 6 of the internal combustion engine 4. The first opening 50 of the air passage 64 is located in the location region R. When the ignition coil 2 is mounted on the internal combustion engine 4, the bolt 25 is inserted in the mounting hole 20 of the flange portion 14. The receiving portion 22 that receives the bolt 25 is located beneath the mounting hole 20. The outer diameter of the receiving portion 22 is greater than the inner diameter of the mounting hole 20. The receiving portion 22 is located in the direction in which the location region R faces, and the flange portion 14 is located above the location region R. External water is blocked by the receiving portion 22 and the flange portion 14 and cannot readily reach the first opening 50. The ignition coil 2 is resistant to water entry into the air passage 64.

In some cases, there is not the receiving portion 22, and the bolt 25 inserted in the mounting hole 20 extends to the top surface of the internal combustion engine. In such a case, the bolt 25 is located in the direction in which the location region R faces. External water is blocked by the bolt 25. Since the first opening 50 is located in the location region R, external water is blocked by the receiving portion 22 or the bolt 25.

In FIG. 3, the reference sign Wr represents the width of the location region R. In view of effectively preventing water entry into the air passage 64, the distance between the center of the first opening 50 and the centerline Lr is preferably 30% or less of the width Wr, more preferably 20% or less of the width Wr, and even more preferably 10% or less of the width Wr. Most preferably, the center of the first opening 50 is located on the centerline Lr.

The first opening 50 in the location region R is preferably located at an end of the head portion 28 that is adjacent to the coil assembly 8. In this case, the air passage 64 can be formed by grooves in the top surface 34 of the head portion 28 and the air hole 62 extending from the bottom of one of the grooves to the bottom surface 38 of the head portion 28. In this embodiment, the air passage 64 is formed by the lead-out groove 52, the first ring groove 54, the connection groove 58, the second ring groove 56, and the air hole 62. The formation of the air passage 64 does not require any hole extending through the interior of the head portion 28 or the coil assembly 8 in a horizontal direction. This makes the production of the ignition coil 2 easy.

The second opening 60 is preferably located in the bottom surface 38 of the head portion 28. Locating the second opening 60 in the bottom surface 38 of the head portion 28 can reduce the length of the air hole 62. This makes the production of the ignition coil 2 easy.

The location of the second opening 60 is not limited to the bottom surface 38 of the head portion 28. For example, the second opening 60 may be located in the outer circumferential surface 46 of the tubular portion 30. In this case, for example, the second ring groove and the air hole's opening in the second ring groove are located above the tubular portion 30. The air hole extends from the bottom of the second ring groove, passes through the head portion 28 and a part of the tubular portion 30, and reaches the outer circumferential surface 46 of the tubular portion 30. The second opening 60 may be at any location where the second opening 60 is connected to the plug hole 6.

Figure 6B:
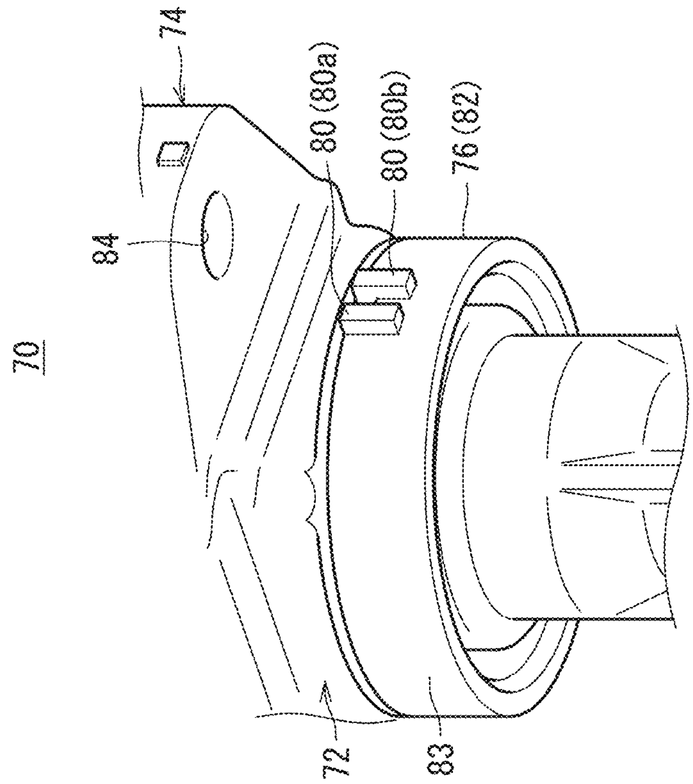
FIG. 6B is a perspective view showing a part of the ignition coil of FIG. 6A.
Figure 6A:
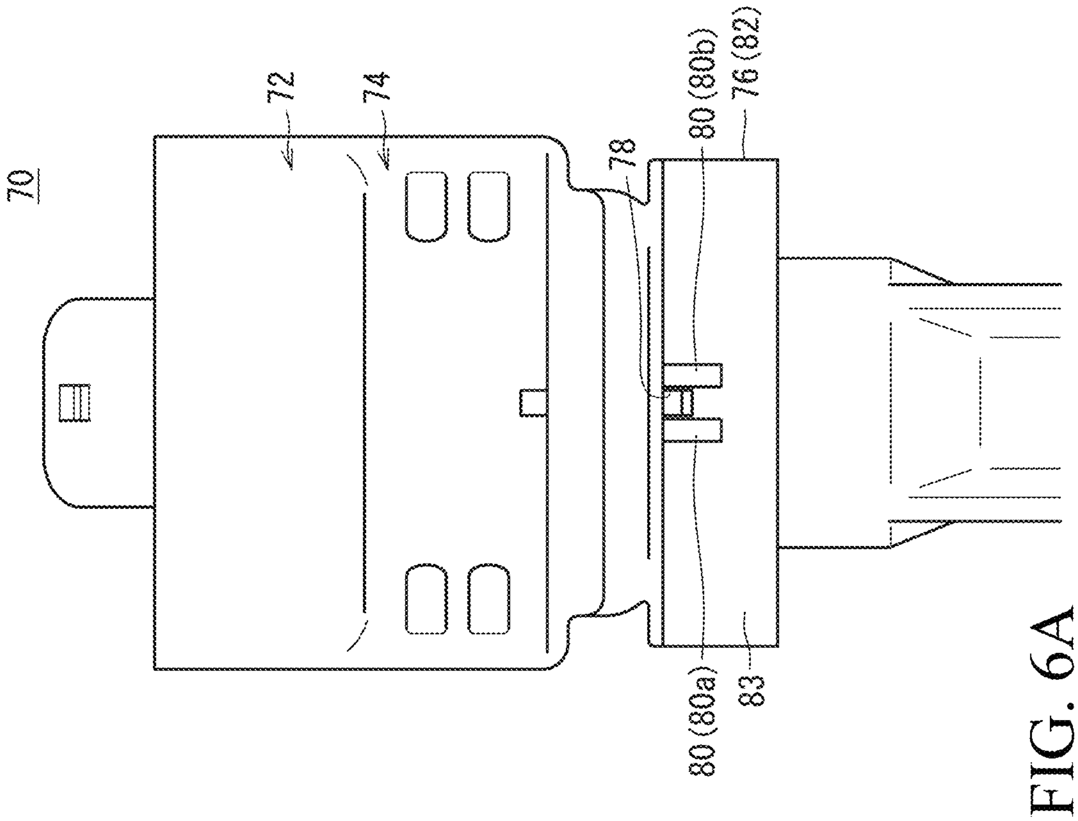
FIG. 6A is a back view showing a part of an ignition coil according to another embodiment.

FIG. 6A is a back view showing a part of an ignition coil 70 according to another embodiment, and FIG. 6B is a perspective view showing a part of the ignition coil 70. As shown in FIGS. 6A and 6B, the ignition coil 70 includes a coil assembly 72, a flange portion 74, and a protector 76. The ignition coil 70 includes a guard 80 located around a first opening 78. The ignition coil 70 is the same as the ignition coil 2 of FIG. 1, except for including the guard 80.

Figure 7:
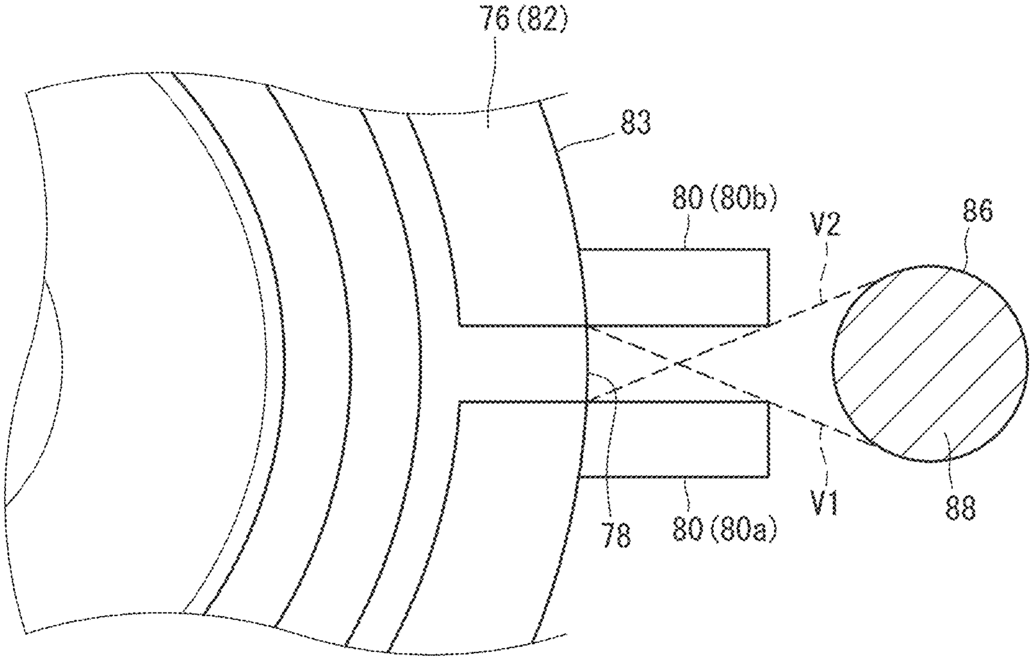
FIG. 7 is an enlarged plan view of a part of a protector of the ignition coil of FIG. 6A.

FIG. 7 is a plan view showing a part of a head portion 82 of the protector 76 of FIG. 6. In this embodiment, the guard 80 projects from a side surface 83 of the head portion 82. The guard 80 is located on both sides of the first opening 78 (in the circumferential direction of the head portion 82). In this embodiment, the guard 80 includes a first portion 80*a* located on one side of the first opening 78 and a second portion 80*b* located on the other side of the first opening 78. The first portion 80*a* and the second portion 80*b* are columnar.

FIG. 7 further shows a cross-section 88 of a bolt 86 inserted in a mounting hole 84 of the flange portion 74. The bolt 86 has an outer diameter equal to the inner diameter of the mounting hole 84 and extends downward beyond the first opening 78. In reality, the receiving portion 22 of the internal combustion engine 4, which has a greater outer diameter than the bolt 86, is located in the direction in which the mounting hole 84 faces. That is, the cross-section 88 is the smallest of the cross-sections of components that may be located in the direction in which the first opening 78 faces. In FIG. 7, the dashed line V1 is a line tangent to the outer circumferential surface of the bolt 86 and passing through a corner of that surface of the first portion 80*a* which is adjacent to the first opening 78, and the dashed line V2 is a line tangent to the outer circumferential surface of the bolt 86 and passing through a corner of that surface of the second portion 80*b* which is adjacent to the first opening 78. Neither of the tangent lines V1 and V2 reach the first opening 78. That is, the first opening 78 is hidden behind the bolt 86 or the guard 80 when the ignition coil 70 is viewed at the level of the first opening 78 in any direction perpendicular to the up-down direction. The first opening 78 in such a state is described herein as being "in a hidden state". In other words, the height of the guard 80 (the height of each of the first and second portions 80*a* and 80*b* in this embodiment) is such that the first opening 78 is in a hidden state.

The ignition coil 70 of this embodiment includes the guard 80 located on both sides of the first opening 78 and projecting from the side surface 83 of the head portion 82. The guard 80 effectively prevents external water from reaching the first opening 78 sideways. The ignition coil 70 is resistant to water entry into the air passage.

As previously stated, the height of the guard 80 is preferably such that the first opening 78 is in a hidden state. In this case, the guard 80 more effectively prevents external water from reaching the first opening 78. The ignition coil 70 is resistant to water entry into the air passage.

The height of the guard 80 need not be such that the first opening 78 is in a hidden state. The height of the guard 80 may be smaller or greater than the minimum height which is such that the first opening 78 is in a hidden state. However, the height of the guard 80 needs to be such that the guard 80 does not contact the receiving portion 22.

The guard 80 is not limited to the shape as shown in FIG. 7. The first and second portions 80*a* and 80*b* may become thinner as they extend outward. Each of the first and second portions 80*a* and 80*b* may be shaped as an arc projecting from the side surface 83 of the head portion 82. The guard 80 may include a third portion located below the first opening 78, projecting outward, and connecting the first portion 80*a* and the second portion 80*b*. The guard 80 may be shaped as a ring projecting from the side surface 83 of the head portion 82 and a side surface of the coil assembly 72 and surrounding the first opening 78. The guard 80 may be in any other shape. It is sufficient that the guard 80 be located on both sides of the first opening 78 and project from the side surface 83 of the head portion 82.

Figure 8A:
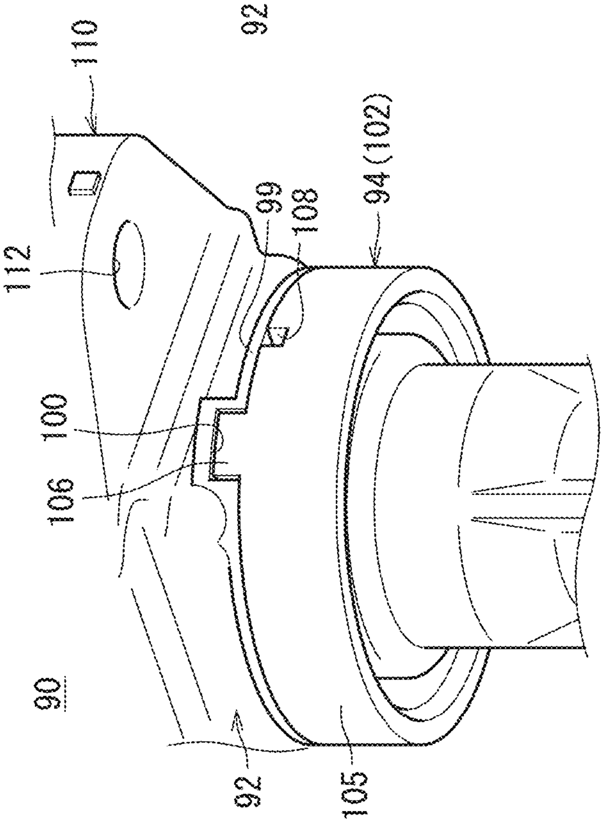
FIG. 8A is a perspective view showing a part of an ignition coil according to yet another embodiment.
Figure 8B:
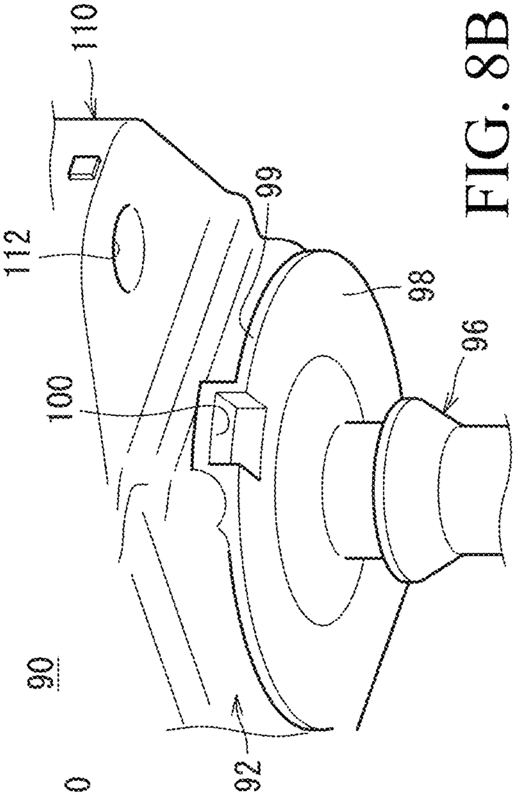
FIG. 8B is a perspective view showing a part of a coil assembly of the ignition coil of FIG. 8A.
Figure 8C:
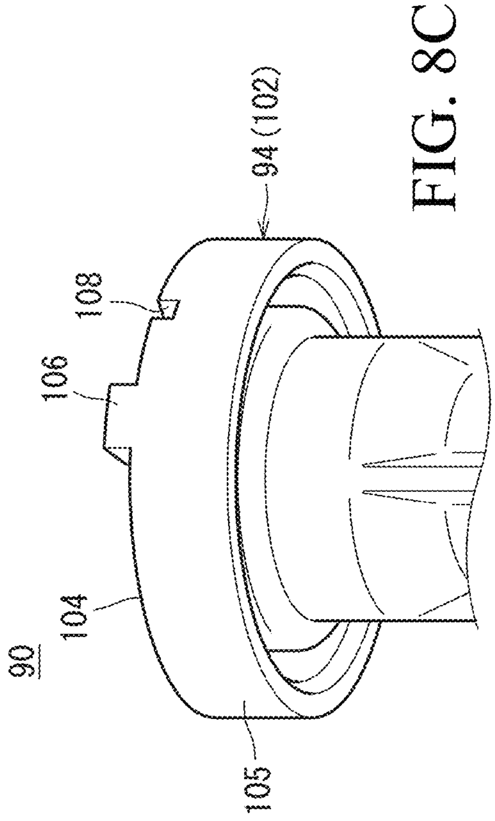
FIG. 8C is a perspective view showing a part of a protector of the ignition coil of FIG. 8A.

FIG. 8A is a perspective view showing a part of an ignition coil 90 according to yet another embodiment, FIG. 8B is a perspective view of the ignition coil 90 with a protector 94 removed from the ignition coil 90, and FIG. 8C is a perspective view of the removed protector 94. FIG. 8B partially shows a coil assembly 92 and an output portion 96 of the ignition coil 90.

As shown in FIG. 8B, the ignition coil 90 includes a recess 100 recessed upward and located at an end of a bottom surface 98 of the coil assembly 92, the end of the bottom surface 98 being adjacent to a side surface 99 of the coil assembly 92. As shown in FIG. 8C, there is a protrusion 106 extending upward and located at an end of a top surface 104 of a head portion 102 of the protector 94, the end of the top surface 104 being adjacent to a side surface 105 of the head portion 102. As shown in FIG. 8A, when the coil assembly 92 and the protector 94 are assembled together, the protrusion 106 is fitted in the recess 100. The ignition coil 90 is the same as the ignition coil 2 of FIG. 1, except for including the recess 100 and the protrusion 106 fitted in the recess 100.

In the ignition coil 90, since the protrusion 106 of the head portion 102 is fitted in the recess 100 of the coil assembly 92, the protector 94 is prevented from rotating relative to the coil assembly 92 during assembly of the coil assembly 92 and the protector 94. This allows for accurate positioning of a first opening 108 relative to the coil assembly 92. Since the case of the coil assembly 92 and a flange portion 110 are integral with each other, the first opening 108 can be accurately positioned relative to a central axis Lf of a mounting hole 112 of the flange portion 110. In the ignition coil 90, the first opening 108 can be accurately positioned on the centerline Lr of the location region R. The ignition coil 90 is resistant to water entry into the air passage.

Although not shown, an ignition coil according to yet another embodiment includes: a protrusion extending downward and located at an end of a bottom surface of a coil assembly, the end of the bottom surface being adjacent to a side surface of the coil assembly; and a recess recessed downward and located at an end of a top surface of a head portion of a protector, the end of the top surface being adjacent to a side surface of the head portion. When the coil assembly and the protector are assembled together, the protrusion is fitted in the recess. The ignition coil is the same as the ignition coil 2 of FIG. 1, except for including the recess and the protrusion fitted in the recess. In the ignition coil, the protector is prevented from rotating relative to the coil assembly during assembly of the coil assembly and the protector.

Figure 9:
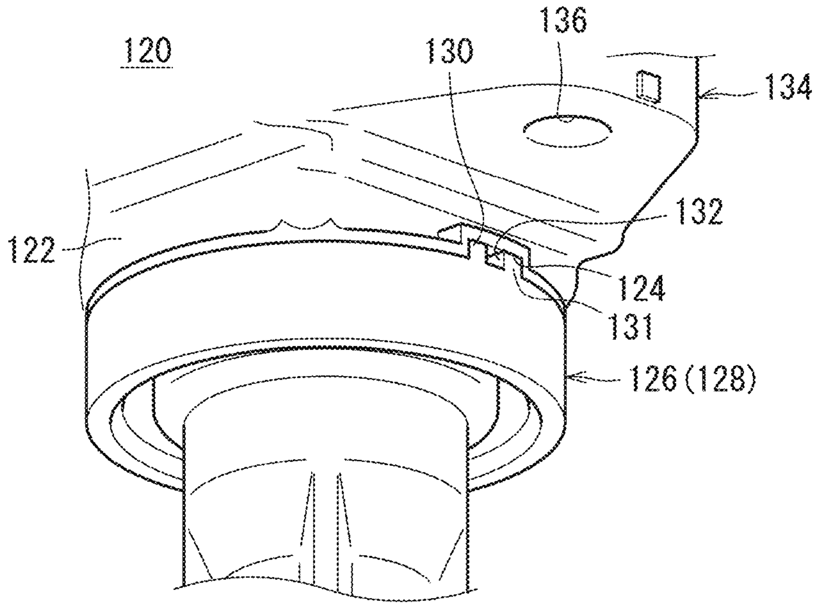
FIG. 9 is a perspective view showing a part of an ignition coil according to yet another embodiment.

FIG. 9 is a perspective view showing a part of an ignition coil 120 according to yet another embodiment. The ignition coil 120 includes a recess 124 located in a bottom surface of a coil assembly 122 and a protrusion 130 located at an upper edge of a head portion 128 of a protector 126, the protrusion 130 being fitted in the recess 124. In this embodiment, the protrusion 130 of the head portion 128 and the recess 124 of the coil assembly 122 are located in the location region R. A first opening 132 is located in a side surface 131 of the protrusion 130 of the head portion 128. The ignition coil 120 is the same as the ignition coil 90 of FIG. 8, except that the protrusion 130 of the head portion 128 and the recess 124 of the coil assembly 122 are located in the location region R and that the first opening 132 is located in the side surface 131 of the protrusion 130.

In the ignition coil 120, the first opening 132 is located in the side surface 131 of that protrusion 130 of the head portion 128 which is fitted in the recess 124 of the coil assembly 122. This allows for accurate positioning of the first opening 132 relative to the coil assembly 122. The first opening 132 can be accurately positioned relative to a central axis Lf of a mounting hole 136 of a flange portion 134. The ignition coil 120 is resistant to water entry into the air passage.

Figure 10A:
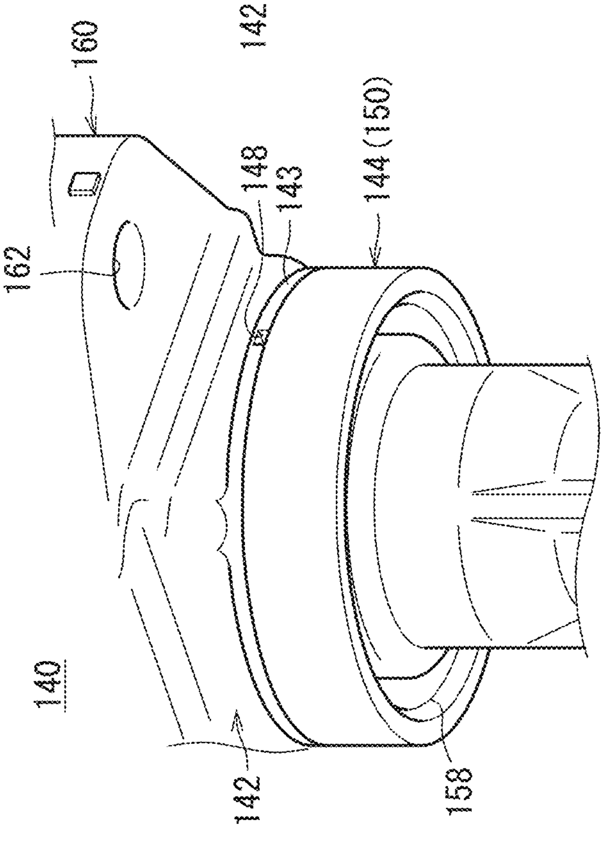
FIG. 10A is a perspective view showing a part of an ignition coil according to yet another embodiment.
Figure 10B:
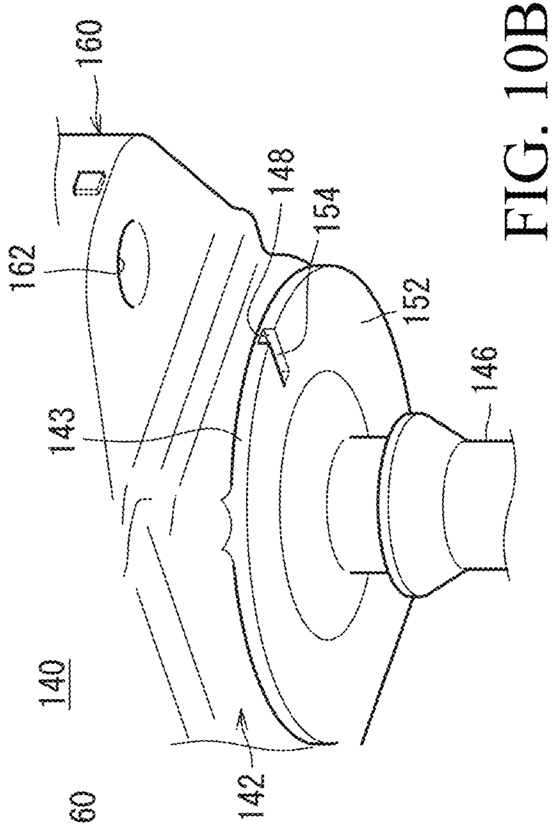
FIG. 10B is a perspective view showing a part of a coil assembly of the ignition coil of FIG. 10A.
Figure 10C:
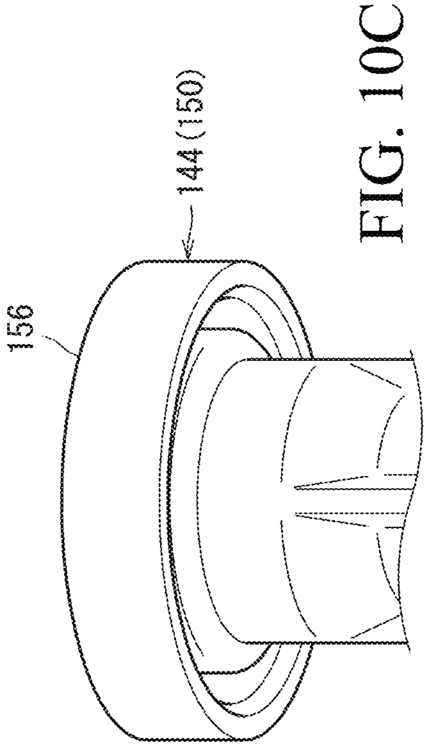
FIG. 10C is a perspective view showing a part of a protector of the ignition coil of FIG. 10A.

FIG. 10A is a perspective view showing a part of an ignition coil 140 according to yet another embodiment, FIG. 10B is a perspective view of the ignition coil 140 with a protector 144 removed from the ignition coil 140, and FIG. 10C is a perspective view of the removed protector 144. FIG. 10B partially shows a coil assembly 142 and an output portion 146 of the ignition coil 140.

In this embodiment, as shown in FIG. 10A, a first opening 148 is located in a side surface 143 of the coil assembly 142. The first opening 148 is located at an end of the side surface 143 of the coil assembly 142, the end of the side surface 143 being adjacent to a head portion 150 of the protector 144. As shown in FIG. 10B, a bottom surface 152 of the coil assembly 142 includes a lead-out groove 154 extending from the first opening 148. Although not shown, a top surface 156 of the head portion 150 includes a first ring groove, a connection groove, and a second ring groove, as with the head portion 28 of FIG. 4A. Furthermore, there is an air hole extending from the bottom of the second ring groove to a bottom surface 158 of the head portion 150. The lead-out groove 154 in the bottom surface 152 of the coil assembly 142 is connected to the first ring groove. In this embodiment, an air passage is formed by the lead-out groove 154, the first ring groove, the connection groove, the second ring groove, and the air hole.

In this embodiment, the first opening 148 is located in the location region R and at that end of the side surface 143 of the coil assembly 142 which is adjacent to the head portion 150. Thus, the air passage can be formed by the groove located in the bottom surface 152 of the coil assembly 142, the grooves located in the top surface 156 of the head portion 150, and the air hole extending from the bottom of one of the grooves to the bottom surface 158 of the head portion 150. The formation of the air passage does not require any hole extending through the interior of the head portion 150 or the coil assembly 142 in a horizontal direction. This makes the production of the ignition coil 140 easy.

In this embodiment, the first opening 148 is located in the side surface 143 of the coil assembly 142. The position of the first opening 148 relative to a central axis Lf of a mounting hole 162 of a flange portion 160 is not affected by rotation of the protector 144 relative to the coil assembly 142. The first opening 148 can be accurately positioned relative to the central axis Lf of the mounting hole 162 of the flange portion 160. In the ignition coil 140, the first opening 148 can be accurately positioned on the centerline Lr of the location region R. The ignition coil 140 is resistant to water entry into the air passage.

Although not shown, an ignition coil according to yet another embodiment includes: a protrusion extending downward and located at an end of a bottom surface of a coil assembly, the end of the bottom surface being adjacent to a side surface of the coil assembly; a recess recessed downward and located at an end of a top surface of a head portion of a protector, the end of the top surface being adjacent to a side surface of the head portion; and a first opening located in a side surface of the protrusion of the coil assembly. When the coil assembly and the protector are assembled together, the protrusion is fitted in the recess. The ignition coil is the same as the ignition coil 140 of FIG. 10, except that that the ignition coil includes the recess and the protrusion fitted in the recess and that the first opening is located in the side surface of the protrusion.

Figure 11:
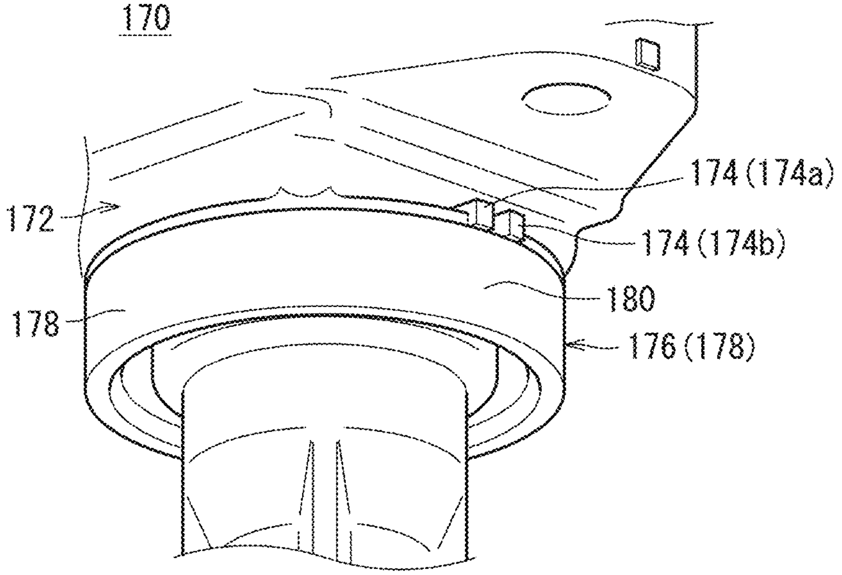
FIG. 11 is a perspective view showing a part of an ignition coil according to yet another embodiment.

FIG. 11 is a perspective view showing a part of an ignition coil 170 according to yet another embodiment. In the ignition coil 170, the first opening is located in the location region R and at an end of a side surface of a coil assembly 172, the end of the side surface being adjacent to a head portion 178 of a protector 176. A guard 174 is located around the first opening. The ignition coil 170 is the same as the ignition coil 140 of FIG. 10, except that the coil assembly 172 includes the guard 174.

In this embodiment, the guard 174 projects from the side surface of the coil assembly 172. The guard 174 is located on both sides of the first opening. In this embodiment, the guard 174 includes a first portion 174*a* located on one side of the first opening and a second portion 174*b* located on the other side of the first opening.

The guard 174 is not limited to the shape as shown in FIG. 11. Each of the first and second portions 174*a* and 174*b* may be shaped as an arc projecting from the side surface of the coil assembly 172. The guard 174 may include a third portion located above the first opening, projecting outward, and connecting the first portion 174*a* and the second portion 174*b*. The guard 174 may be shaped as a ring projecting from the side surface of the coil assembly 172 and a side surface 180 of the head portion 178 and surrounding the first opening. The guard 174 may be in any other shape. It is sufficient that the guard 174 be located on both sides of the first opening and project from the side surface of the coil assembly 172.

In the embodiments described above, the first opening is located either in the side surface of the head portion or in the side surface of the coil assembly. The first opening may extend from the side surface of the head portion to the side surface of the coil assembly. In this case, the top surface of the head portion includes a lead-out groove extending from the first opening, and the bottom surface of the coil assembly includes a lead-out groove extending from the first opening.

According to any of the present embodiments, as described above, water entry into the air passage of the ignition coil can be reduced. This demonstrates the superiority of the present embodiments.

Disclosed Items

The following items disclose preferred embodiments.

[Item 1]

An ignition coil for an internal combustion engine, the ignition coil including:

- a coil assembly including a primary coil and a secondary coil;
- an output portion extending downward from the coil assembly;
- a protector covering an outer circumference of the output portion and extending downward from the coil assembly; and
- a flange portion projecting backward from the coil assembly and including a mounting hole extending from top to bottom of the flange portion, wherein
- the protector includes
  - a head portion that is exposed outside the internal combustion engine when the ignition coil is mounted on the internal combustion engine, and
  - a tubular portion that extends downward from a bottom surface of the head portion and that is inserted in a plug hole of the internal combustion engine when the ignition coil is mounted on the internal combustion engine,
- the ignition coil includes an air passage having a first opening and a second opening and connecting an external environment and the plug hole of the internal combustion engine,
- the first opening is located in a region on an outer surface of the coil assembly located beneath the flange portion or an outer surface of the head portion,
- the region extends in an up-down direction,
- when viewed in a reference direction that is perpendicular to a central axis of the mounting hole and extends from the central axis of the mounting hole toward a central axis of the protector, a centerline of the region overlaps with the central axis of the mounting hole, and
- when viewed in the reference direction, a width of the region is equal to a width of the mounting hole.

[Item 2]

The ignition coil according to item 1, wherein the second opening is located in the bottom surface of the head portion.

[Item 3]

The ignition coil according to item 1 or 2, including a guard located on both sides of the first opening and projecting from a side surface of the head portion or a side surface of the coil assembly.

[Item 4]

The ignition coil according to item 3, wherein

- the guard has a height such that, when a bolt having an outer diameter equal to an inner diameter of the mounting hole and extending downward beyond the first opening is inserted in the mounting hole and the ignition coil is viewed at a level of the first opening in any direction perpendicular to the up-down direction, the first opening is hidden behind the bolt or the guard.

[Item 5]

The ignition coil according to any one of items 1 to 4, wherein

- the head portion includes a protrusion located at an end of a top surface of the head portion and extending upward from the top surface, the end of the top surface being adjacent to a side surface of the head portion, and
- the coil assembly includes a recess which is located in a bottom surface of the coil assembly and in which the protrusion is fitted.

[Item 6]

The ignition coil according to item 5, wherein the first opening is located in a side surface of the protrusion.

[Item 7]

The ignition coil according to any one of items 1 to 6, wherein

- the first opening is located at an end of a side surface of the head portion, the end of the side surface being adjacent to the coil assembly, and
- the air passage includes
  - a groove located in a top surface of the head portion and connected to the first opening, and
  - a hole extending from a bottom of the groove to the second opening.

[Item 8]

The ignition coil according to any one of items 1 to 7, wherein

- the first opening is located at an end of a side surface of the coil assembly, the end of the side surface being adjacent to the head portion.

[Item 9]

The ignition coil according to item 8, wherein

- the second opening is located in the bottom surface of the head portion, and
- the air passage further includes
  - a first groove located in a bottom surface of the coil assembly and connected to the first opening,
  - a second groove located in a top surface of the head portion and connected to the first groove, and
  - a hole extending from a bottom of the second groove to the second opening.

[Item 10]

An ignition coil-internal combustion engine assembly including:

- the ignition coil according to any one of items 1 to 9; and
- an internal combustion engine including a plug hole in which the tubular portion of the protector of the ignition coil is inserted.

INDUSTRIAL APPLICABILITY

The ignition coil as described above is used in various internal combustion engines.

REFERENCE SIGNS LIST

2, 70, 90, 120, 140, 170 . . . ignition coil
4 . . . internal combustion engine
6 . . . plug hole
8, 72, 92, 122, 142, 172 . . . coil assembly
10 . . . connector portion
12, 96, 146 . . . output portion
14, 74, 110, 134, 160 . . . flange portion
16, 76, 94, 126, 144, 176 . . . protector
20, 84, 112, 136, 162 . . . mounting hole of flange portion
22 . . . receiving portion
24 . . . mounting hole of receiving portion
28, 82, 102, 128, 150, 178 . . . head portion
30 . . . tubular portion
32 . . . hole of head portion
34, 104, 156 . . . top surface of head portion
36, 98 . . . bottom surface of coil assembly
38, 158 . . . bottom surface of head portion
40 . . . fitting groove
42 . . . protrusion of internal combustion engine
44 . . . hole of tubular portion
46 . . . outer circumferential surface of tubular portion

48 . . . inner circumferential surface
50, 78, 108, 132, 148 . . . first opening
52, 154 . . . lead-out groove
54 . . . first ring groove
56 . . . second ring groove
58 . . . connection groove
60 . . . second opening
62 . . . air hole
64 . . . air passage
80, 174 . . . guard
83, 105, 180 . . . side surface of head portion
25, 86 . . . bolt
88 . . . cross-section
99, 143, 178 . . . side surface of coil assembly
100, 124 . . . recess
106, 130 . . . protrusion of head portion
131 . . . side surface of protrusion of head portion

The invention claimed is:

1. An ignition coil for an internal combustion engine, the ignition coil comprising:
- a coil assembly including a primary coil and a secondary coil;
- an output portion extending downward from the coil assembly;
- a protector covering an outer circumference of the output portion and extending downward from the coil assembly; and
- a flange portion projecting backward from the coil assembly and including a mounting hole extending from top to bottom of the flange portion, wherein
- the protector includes
  - a head portion that is exposed outside the internal combustion engine when the ignition coil is mounted on the internal combustion engine, and
  - a tubular portion that extends downward from a bottom surface of the head portion and that is inserted in a plug hole of the internal combustion engine when the ignition coil is mounted on the internal combustion engine,
- the ignition coil includes an air passage having a first opening and a second opening and connecting an external environment and the plug hole of the internal combustion engine,
- the first opening is located in a region on an outer surface of the coil assembly located beneath the flange portion or an outer surface of the head portion,
- the region extends in an up-down direction,
  - when viewed in a reference direction that is perpendicular to a central axis of the mounting hole and extends from the central axis of the mounting hole toward a central axis of the protector, a centerline of the region overlaps with the central axis of the mounting hole, and
  - when viewed in the reference direction, a width of the region is equal to a width of the mounting hole.

2. The ignition coil according to claim 1, wherein the second opening is located in the bottom surface of the head portion.

3. The ignition coil according to claim 1, comprising a guard located on both sides of the first opening and projecting from a side surface of the head portion or a side surface of the coil assembly.

4. The ignition coil according to claim 3, wherein
- the guard has a height such that, when a bolt having an outer diameter equal to an inner diameter of the mounting hole and extending downward beyond the first opening is inserted in the mounting hole and the ignition coil is viewed at a level of the first opening in any direction perpendicular to the up-down direction, the first opening is hidden behind the bolt or the guard.

5. The ignition coil according to claim 1, wherein
- the head portion includes a protrusion located at an end of a top surface of the head portion and extending upward from the top surface, the end of the top surface being adjacent to a side surface of the head portion, and
- the coil assembly includes a recess which is located in a bottom surface of the coil assembly and in which the protrusion is fitted.

6. The ignition coil according to claim 5, wherein the first opening is located in a side surface of the protrusion.

7. The ignition coil according to claim 1, wherein
- the first opening is located at an end of a side surface of the head portion, the end of the side surface being adjacent to the coil assembly, and
- the air passage includes
  - a groove located in a top surface of the head portion and connected to the first opening, and
  - a hole extending from a bottom of the groove to the second opening.

8. The ignition coil according to claim 1, wherein
- the first opening is located at an end of a side surface of the coil assembly, the end of the side surface being adjacent to the head portion.

9. The ignition coil according to claim 8, wherein,
- the second opening is located in the bottom surface of the head portion, and
- the air passage further includes
  - a first groove located in a bottom surface of the coil assembly and connected to the first opening,
  - a second groove located in a top surface of the head portion and connected to the first groove, and
  - a hole extending from a bottom of the second groove to the second opening.

10. An ignition coil-internal combustion engine assembly comprising:
- the ignition coil according to claim 1; and
- an internal combustion engine including a plug hole in which the tubular portion of the protector of the ignition coil is inserted.

* * * * *